US011689651B2

(12) United States Patent
Feng

(10) Patent No.: US 11,689,651 B2
(45) Date of Patent: Jun. 27, 2023

(54) SLIDABLE FLEXIBLE DISPLAY DEVICE

(71) Applicant: Wuhan China Star Optoelectronics Semiconductor Display Technology Co., Ltd., Hubei (CN)

(72) Inventor: Zikang Feng, Hubei (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 262 days.

(21) Appl. No.: 17/284,798

(22) PCT Filed: Mar. 29, 2021

(86) PCT No.: PCT/CN2021/083526
§ 371 (c)(1),
(2) Date: Apr. 13, 2021

(87) PCT Pub. No.: WO2022/193358
PCT Pub. Date: Sep. 22, 2022

(65) Prior Publication Data
US 2023/0108833 A1 Apr. 6, 2023

(30) Foreign Application Priority Data
Mar. 18, 2021 (CN) .......................... 202110292885.7

(51) Int. Cl.
*H04M 1/00* (2006.01)
*H04M 1/02* (2006.01)

(52) U.S. Cl.
CPC ....... *H04M 1/0268* (2013.01); *H04M 1/0237* (2013.01)

(58) Field of Classification Search
CPC ............. H04M 1/0235; H04M 1/0237; H04M 1/0239; H04M 1/0268; H04M 1/0269
See application file for complete search history.

(56) References Cited

U.S. PATENT DOCUMENTS

| | | | |
|---|---|---|---|
| 10,747,269 B1 | 8/2020 | Choi | |
| 11,219,132 B2* | 1/2022 | Song | .................... H05K 5/0004 |
| 11,329,247 B2* | 5/2022 | Baek | ........................ G06F 3/046 |
| 11,553,614 B2* | 1/2023 | Cho | .................... H04M 1/0268 |
| 2022/0151091 A1* | 5/2022 | Kang | .................... G06F 1/1652 |

FOREIGN PATENT DOCUMENTS

| | | |
|---|---|---|
| CN | 105518769 | 4/2016 |
| CN | 110393398 | 11/2019 |
| CN | 111145648 | 5/2020 |
| CN | 111210734 | 5/2020 |
| CN | 111599277 | 8/2020 |

(Continued)

Primary Examiner — Nhan T Le

(57) ABSTRACT

The present application discloses a slidable flexible display device, including a first supporting body, a second supporting body, and a linkage mechanism. The first supporting body includes a first rear shell and a rear shell disposed on the first rear shell. The first supporting body and the second supporting body are slidable along a straight line between the first supporting body and the second supporting body. The linkage mechanism includes screw rod assemblies and a screen fixing plate. The first supporting plate and the screen fixing plate are respectively linked to the screw rod assemblies.

19 Claims, 8 Drawing Sheets

(56) References Cited

FOREIGN PATENT DOCUMENTS

| | | |
|---|---|---|
| CN | 111833748 | 10/2020 |
| CN | 112153180 | 12/2020 |
| CN | 112153181 | 12/2020 |
| CN | 112235442 | 1/2021 |
| CN | 212627978 | 2/2021 |
| WO | WO 2021/012252 | 1/2021 |

* cited by examiner

SLIDABLE FLEXIBLE DISPLAY DEVICE

RELATED APPLICATIONS

This application is a National Phase of PCT Patent Application No. PCT/CN2021/083526 having International filing date of Mar. 29, 2021, which claims the benefit of priority of Chinese Patent Application No. 202110292885.7 filed on Mar. 18, 2021. The contents of the above applications are all incorporated by reference as if fully set forth herein in their entirety.

FIELD AND BACKGROUND OF THE INVENTION

The present application relates to the technical field of display devices, and in particular to a slidable flexible display device.

At present, screens of communication devices such as mobile phones are basically rigid structures, have a certain size, and cannot be rolled or stretched. User experience of devices with small screens in viewing movies, games, and mobile office is inferior to that of devices with large screens. For mobile phones whose screen size cannot be changed, if the screen is forcibly enlarged to improve user experience, an overall size of the mobile phone will become larger, which will affect portability of the mobile phone.

Therefore, the present application provides a slidable flexible display device whose display size (screen size) can be changed, which can reduce a space occupied by a larger-size screen, and make the large-screen device more portable.

SUMMARY OF THE INVENTION

The present application proposes a slidable flexible display device, which can increase a size of the slidable flexible display device in a sliding direction by sliding a part of a mechanism like a sliding cover mobile phone. During a sliding process, a flexible display screen originally hidden in a housing is pulled out to an upper surface of the mechanism through a cooperation of screw rod assemblies, linkage gear, and other structures, so that a display size of the device is increased, and the display size is reduced to an original size by sliding the part of the mechanism in an opposite direction.

An embodiment of the present application provides a slidable flexible display device, including:

a first supporting body including a first rear shell and a first supporting plate fixedly disposed on the first rear shell;

a second supporting body including a second rear shell, a second supporting plate, and side walls, wherein the side walls are disposed on both sides of the second rear shell, the second supporting plate is fixedly disposed on the side walls, and the first supporting body and the second supporting body are slidable along a straight line between the first supporting body and the second supporting body;

a linkage mechanism including screw rod assemblies, a screen fixing plate, and a roller, wherein each of the screw rod assemblies includes a first screw rod and a second screw rod disposed in parallel, the first screw rod and the second screw rod are rotatable and are connected to each other, each of the side walls is provided with one of the screw rod assemblies fixedly disposed on the side wall, the screen fixing plate and the first supporting plate are oppositely disposed on both sides of the screw rod assemblies, the roller is disposed close to an arc-shaped end of the second rear shell and is clamped between both the side walls, the roller is rotatable, and a rotation axis of the screw rod assemblies and a rotation axis of the roller are perpendicular to each other; and a flexible display screen disposed on the first supporting plate and the second supporting plate, wherein an end of the flexible display screen is fixed to an arc end of the first supporting plate, and another end of the flexible display screen is disposed around the roller, flipped to under the screw rod assemblies, and fixed on a surface of the screen fixing plate;

wherein through a linkage connection between the first supporting plate and the first screw rods of the screw rod assemblies and a linkage connection between the screen fixing plate and the second screw rods of the screw rod assemblies, the first supporting plate and the screen fixing plate are slidable in opposite directions; when the screen fixing plate moves away from the first supporting plate, the flexible display screen is unfolded; and when the screen fixing plate moves close to the first supporting plate, the flexible display screen is folded.

In some embodiments, surfaces of the first screw rod and the second screw rod include rotating threaded structures.

In some embodiments, directions of rotating threaded structures of the first screw rod and the second screw rod of the screw rod assemblies are opposite, or directions of rotational movement of the first screw rod and the second screw rod of the screw rod assemblies are opposite.

In some embodiments, at least an end of the first screw rod or an end of the second screw rod of the screw rod assemblies is connected to a linkage gear to make the first screw rod and the second screw rod keep in linkage.

In some embodiments, a linkage gear is disposed in the bracket structure.

In some embodiments, a bottom of the first supporting plate includes at least one first nut structure with a hole structure, and the first screw rod passes through the first nut structure. Moreover, an inner surface of the first nut structure includes a threaded structure matched with a rotating threaded structure of the first screw rod to make the first supporting plate connected to the screw rod assemblies through the first nut structure.

In some embodiments, a side of the screen fixing plate is provided with a second nut structure having a structure same as the first nut structure. Moreover, an inner surface of the second nut structure includes a threaded structure matched with a rotating threaded structure of the second screw rod to make the screen fixing plate connected to the second screw rod through the second nut structure.

In some embodiments, the side walls are an elongated structure, both ends of each of the side walls include a bracket structure, and the screw rod assemblies are disposed between the two bracket structures of the side walls to dispose the screw rod assemblies on the side walls.

In some embodiments, a wall shaft further disposed at the ends of the side walls outside of the bracket structure to dispose the roller.

In some embodiments, the side walls are provided with sliding structures disposed on an inner side of the side walls, and both sides of the first supporting plate are slidably connected to the side walls through the sliding structures. The sliding structures are sliding rails.

In some embodiments, both ends of the roller are formed with a wall shaft hole respectively, and a size of the wall shaft hole is matched to the wall shaft to dispose the roller on the side walls. The wall shaft hole is sleeved on the wall shaft, and the roller is clamped and disposed between the two side walls to make the roller rotatable.

In some embodiments, the sliding structures are mutually matching and respectively disposed on contact surfaces of the first rear shell and the second rear shell to make the first rear shell slidably connected to the second rear shell.

In some embodiments, the sliding structures are mutually matching and respectively disposed on contact surfaces of the first supporting plate and the second supporting plate to make the first supporting plate slidably connected to the second supporting plate.

In some embodiments, the sliding structures are mutually matching and respectively disposed on contact surfaces of the side walls and the first rear shell to make the side walls slidably connected to the first rear shell.

In some embodiments, a moving speed of the screen fixing plate relative to the second supporting body is same as a moving speed of the second supporting body relative to the first supporting body. In other words, the moving speed of the screen fixing plate relative to the second supporting plate is same as the moving speed of the second supporting plate relative to the first supporting plate. In this way, the flexible display screen can be prevented from damage caused by a pulling force on the flexible display screen.

In some embodiments, when the first supporting body moves away from or close to the second supporting body for sliding movement, the first supporting plate and the screen fixing plate are slidable in opposite directions, thereby realizing the unfolding or folding of the flexible display screen.

In some embodiments, the linkage gear is connected to a motor to automatically operate the flexible display screen.

In some embodiments, when the first supporting plate slides and moves, the first screw rod is rotated by the first nut structure, thereby driving the adjacent second screw rod to rotate. When the second screw rod rotates, the screen fixing plate is driven by the second nut structure to generate a linked sliding movement.

The beneficial effects of the present application are as follows.

The present application proposes a slidable flexible display device, which can increase a size of the slidable flexible display device in a sliding direction by sliding a part of a mechanism like a sliding cover mobile phone. During a sliding process, a flexible display screen originally hidden in a housing is pulled out to an upper surface of the mechanism through a cooperation of screw rod assemblies, linkage gear, and other structures, so that a display size of the device is increased, and the display size is reduced to an original size by sliding the part of the mechanism in an opposite direction. In the present application, a motor can be connected to the linkage gear, and then an entire slidable flexible display device can be driven to move by electricity, instead of pushing by an external force, to complete a switching of two display states of unfolding and folding.

BRIEF DESCRIPTION OF THE SEVERAL VIEWS OF THE DRAWINGS

The technical solutions and other beneficial effects of the present application will be made obvious by describing the specific implementation manners of the present application in detail below in conjunction with the accompanying drawings.

Figure 1:
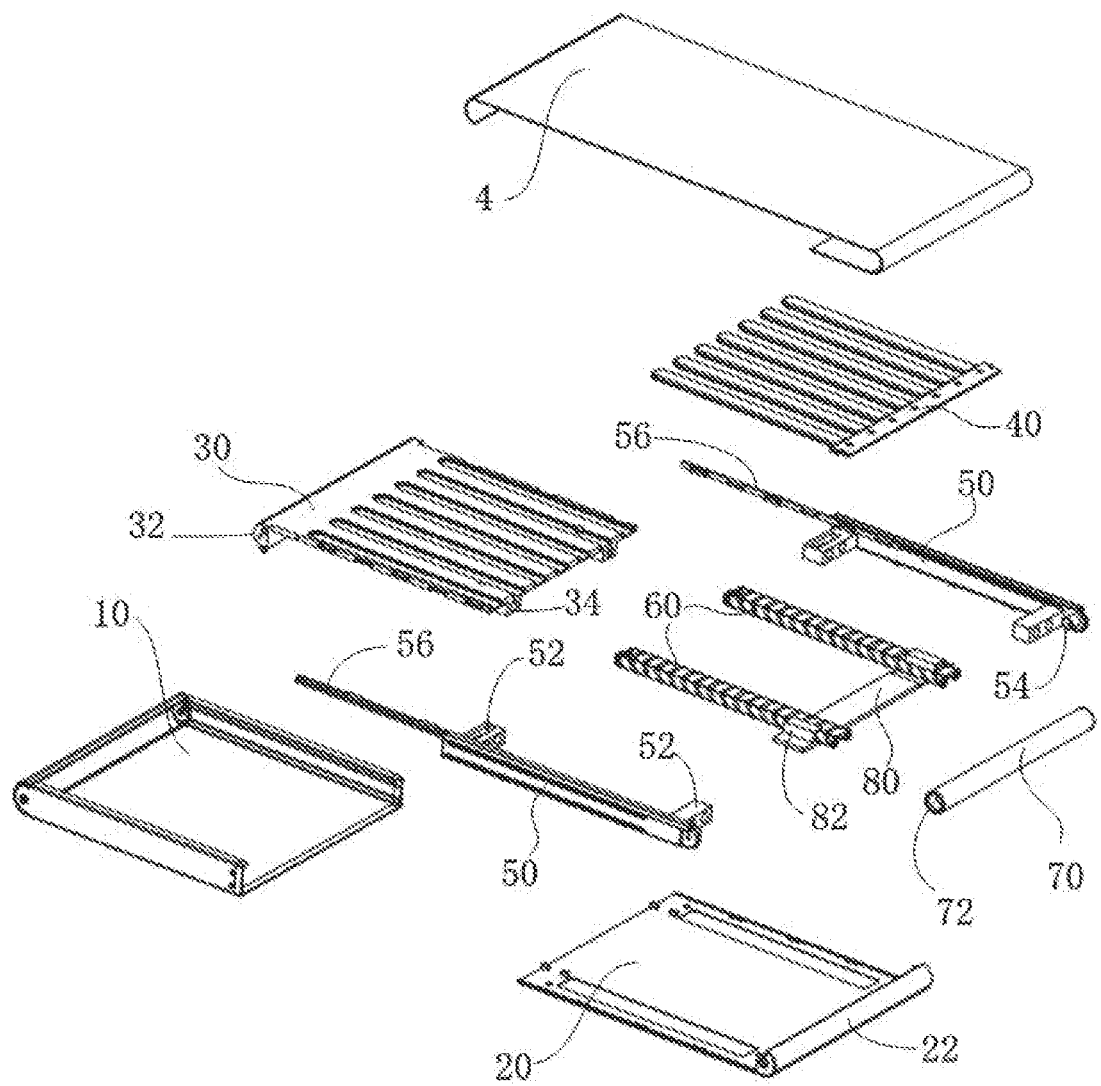
FIG. 1 is an exploded view of a slidable flexible display device in an embodiment.

The labels in the drawings are: first supporting body 1; second supporting body 2; linkage mechanism 3; flexible display screen 4; first rear shell 10; second rear shell 20; arc-shaped end 22; first supporting plate 30; arc end 32; first nut structure 34; second supporting plate 40; side walls 50; bracket structure 52; wall shaft 54; sliding structure 56; screw rod assemblies 60; first screw rod 60*a*; second screw rod 60*b*; roller 70; screen fixing plate 80; second nut structure 82; and linkage gear 110.

DESCRIPTION OF SPECIFIC EMBODIMENTS OF THE INVENTION

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in the present application, all other embodiments obtained by those skilled in the art without creative work shall fall within the protection scope of the present application.

The present application will be further explained below in conjunction with the drawings and specific embodiments as follows.

Figure 2:
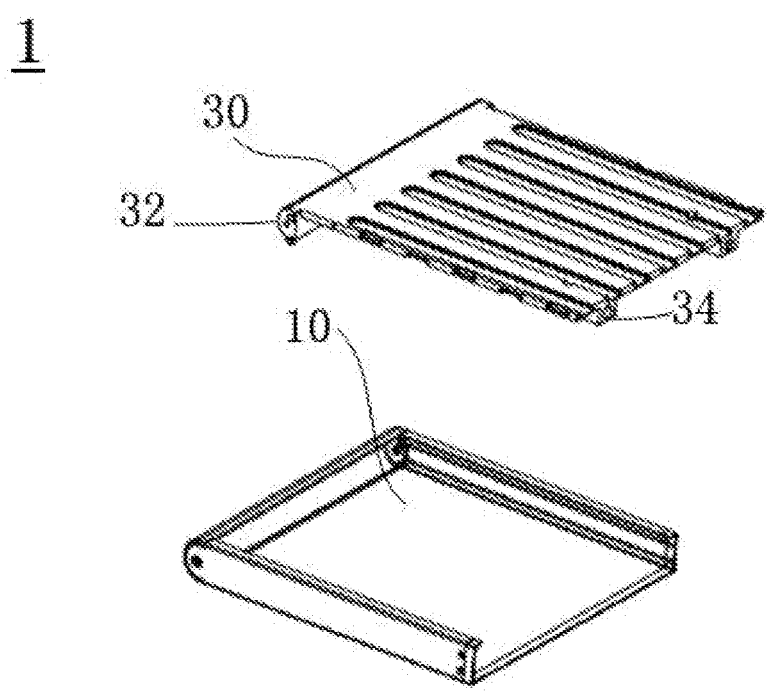
FIG. 2 is an exploded view of a first supporting body of the slidable flexible display device of FIG. 1.
Figure 3:
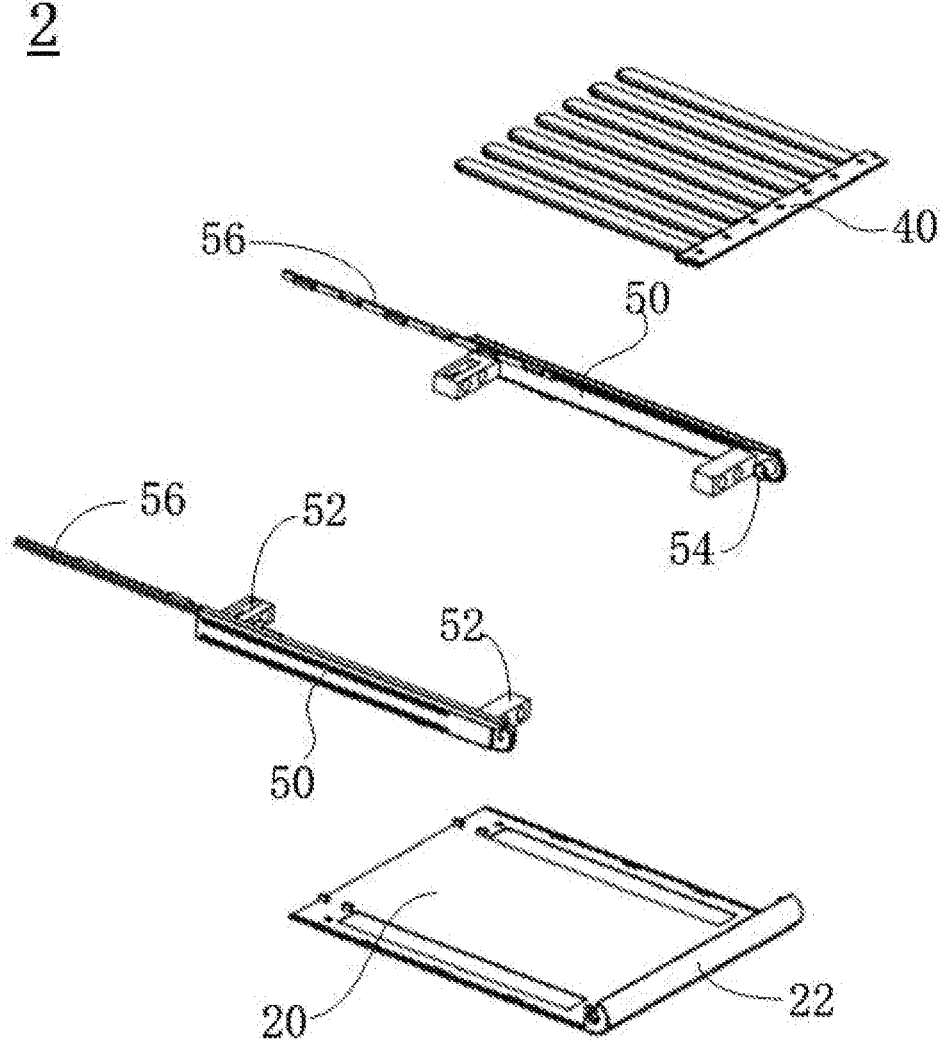
FIG. 3 is an exploded view of a second supporting body of the slidable flexible display device of FIG. 1.
Figure 4:
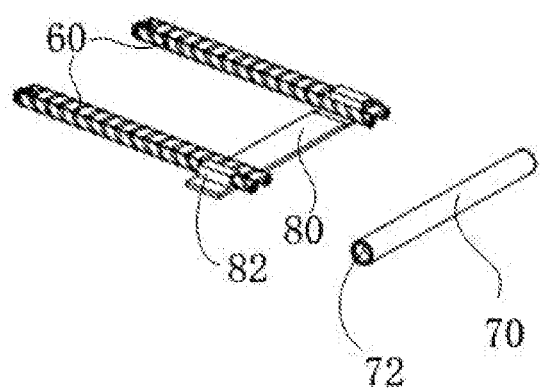
FIG. 4 is an exploded view of a linkage mechanism of the slidable flexible display device of FIG. 1.

An embodiment of the present application provides a slidable flexible display device. Refer to FIG. 1 to FIG. 11. The slidable flexible display device includes a first supporting body 1, a second supporting body 2, a linkage mechanism 3, and a flexible display screen 4. As shown in FIG. 2, the first supporting body 1 includes a first rear shell 10 and a first supporting plate 30. As shown in FIG. 3, the second supporting body 2 includes a second rear shell 20, a second supporting plate 40, and side walls 50. As shown in FIG. 4, the linkage mechanism 3 includes screw rod assemblies 60, a roller 70, and a screen fixing plate 80.

In the present embodiment, the first supporting plate 30 is fixedly disposed on the first rear shell 10. A bottom of the first supporting plate 30 has at least one first nut structure 34 with a hole structure.

In the present embodiment, side walls 50 are fixedly disposed on both sides of the second rear shell 20, respectively. The side walls 50 are an elongated shape, and two ends of the side walls 50 each have a bracket structure 52. A wall shaft 54 is further disposed at an end of each of the side walls 50 outside of the bracket structure 52. The side walls 50 are disposed on both sides of the second rear shell 20. Both the side walls 50 are disposed oppositely. The second supporting plate 40 is fixedly disposed on the side walls 50.

In the present embodiment, sliding structures 56 are also connected to the side walls 50. Both sides of the first supporting plate 30 are slidably connected to the side walls 50 through the sliding structures 56 so that the first support plate 30 and the side walls 50 can slide mutually. Specifically, the sliding structures 56 can be positioned above the bracket structures 52 and parallel to the screw rod assemblies 60. A sliding direction here and a rotation axis of the roller 70 are perpendicular to each other. For example, the sliding structures 56 can be a sliding rail.

In the present embodiment, the screw rod assemblies 60 are fixedly disposed on each of the side walls 50. The screw rod assemblies 60 include a first screw rod 60a and a second screw rod 60b disposed in parallel, and the first screw rod 60a and the second screw rod 60b are rotatable and are connected to each other. Surfaces of the first screw rod 60a and the second screw rod 60b have a rotating threaded structure. Specifically, in the screw rod assemblies 60, at least one end of the first screw rod 60a and the second screw rod 60b is connected to a linkage gear 110 to make the first screw rod 60a and the second screw rod 60b keep in linkage. For example, the linkage gear 110 can be disposed in the bracket structure 52.

The roller 70 is clamped between both the side walls 50, and the roller 70 is rotatable. A position of the roller 70 is close to an arc-shaped end 22 of the second rear shell 20. Specifically, both ends of the roller 70 are respectively formed with a wall shaft hole 72. A size of the wall shaft hole 72 is matched to the wall shaft 54, and the wall shaft hole 72 can be sleeved on the wall shaft 54. Therefore, the roller 70 can be clamped between both the side walls 50, and the roller 70 is rotatable.

It is further defined that a rotation axis of the screw rod assemblies 60 and the rotation axis of the roller 70 are perpendicular to each other.

Specifically, the first screw rod 60a can pass through the first nut structure 34, and an inner surface of the first nut structure 34 includes a threaded structure matched with the rotating threaded structure of the first screw rod 60a to make the first supporting plate 30 connected to the first screw rod 60a of the screw rod assemblies 60 through the first nut structure 34. In addition, a side of the screen fixing plate 80 is provided with a second nut structure 82 having a structure same as the first nut structure 34, and an inner surface of the second nut structure 82 includes a threaded structure matched with the rotating threaded structure of the second screw rod 60b to make the screen fixing plate 80 connected to the second screw rod 82 through the second nut structure 60b.

Furthermore, directions of rotating threaded structures of the first screw rod 60a and the second screw rod 60b of the screw rod assemblies 60 are opposite, or directions of rotational movement of the first screw rod 60a and the second screw rod 60b of the screw rod assemblies 60 are opposite, so as to realize the first supporting plate 30 and the screen fixing plate 80 being slid in opposite directions.

In the present embodiment, the flexible display screen 4 is disposed on the first supporting plate 30 and the second supporting plate 40, an end of the flexible display screen 4 is fixed to an arc end 32 of the first supporting plate 30, and another end of the flexible display screen is disposed around the roller 70, flipped to under the screw rod assemblies 60, and fixed on a surface of the screen fixing plate 80.

In the present embodiment, the screen fixing plate 80 is connected to the second screw rod 60b of the screw rod assemblies 60. In addition, the screen fixing plate 80 and the first supporting plate 30 and/or the second supporting plate 40 are disposed in parallel on both sides of the screw rod assemblies 60.

In the present embodiment, a moving speed of the screen fixing plate 80 relative to the second supporting body 2 is same as a moving speed of the second supporting body 2 relative to the first supporting body 1. In other words, the moving speed of the screen fixing plate 80 relative to the second supporting plate 40 is same as the moving speed of the second supporting plate 40 relative to the first supporting plate 30. In this way, the flexible display screen 4 can be prevented from damage caused by a pulling force on the flexible display screen 4.

Figure 5:
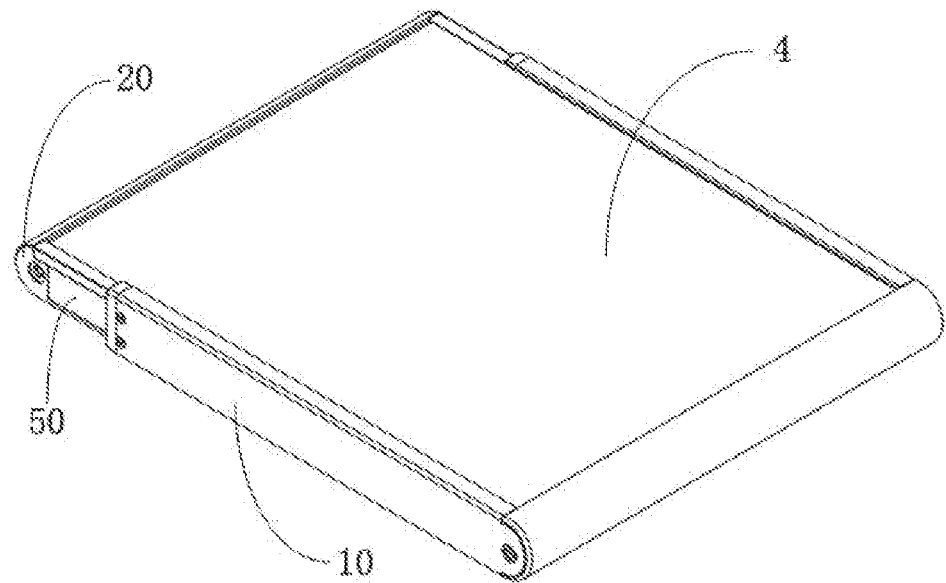
FIG. 5 is a schematic structural diagram of the slidable flexible display device in a folded state in an embodiment.
Figure 6:
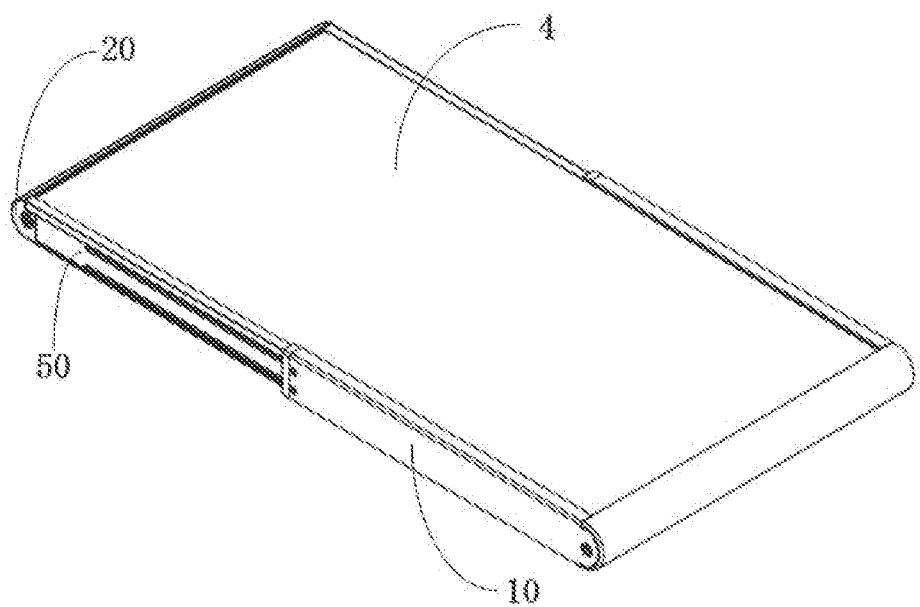
FIG. 6 is a schematic structural diagram of the slidable flexible display device in an unfolded state in an embodiment.

In the slidable flexible display device provided by the present embodiment, the first supporting body 1 and the second supporting body 2 can slide along a straight line. Specifically, refer to FIG. 5 and FIG. 6, where FIG. 5 is a view of the slidable flexible display device in a folded state, the first supporting body 1 and the second supporting body 2 are in the closest state, wherein the most part of the second supporting body 2 is positioned in an inner space of the first supporting body 1. When the first supporting body 1 and the second supporting body 2 slide to a larger distance, that is the slidable flexible display device in an unfolded state as shown in FIG. 6.

Specifically, in the slidable flexible display device, the sliding structures are mutually matching and respectively disposed on contact surfaces of the first rear shell 10 and the second rear shell 20 to make the first rear shell 10 slidably connected to the second rear shell 20. The first supporting plate 30 and the second supporting plate 40 are slidably connected to each other. For example, a part of structure of the second supporting plate 40 can be embedded and placed on an upper surface of the first supporting plate 30, and the second supporting plate 40 and the first supporting plate 30 can slide relative to each other. Moreover, a height of the second supporting plate 40 and the upper surface of the first supporting plate 30 is always same to support the flexible display screen 4 together.

Figure 7:
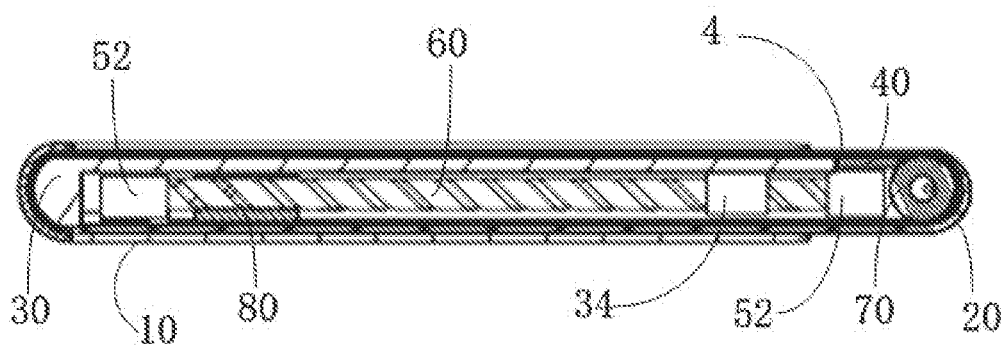
FIG. 7 is a cross-sectional view of FIG. 5.
Figure 8:
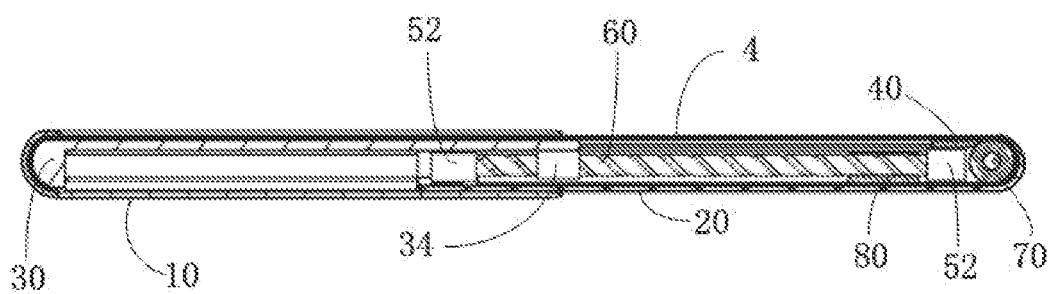
FIG. 8 is a cross-sectional view of FIG. 6.

Refer to FIG. 7 and FIG. 8, it can be seen that as the first supporting body 1 slides away from the second supporting body 2, a part of the second supporting body 2 originally positioned in an inner space of the slidable flexible display device is displayed along with a linked movement. At the same time, it can also be seen from the figure that the screen fixing plate 80 connected to an end of the flexible display screen 4 slides from a position away from the roller 70 in the folded state to a position close to the roller 70 in the unfolded state, thereby achieving unfolding the flexible display screen 4 from the inside, and achieving enlarging a screen of the slidable flexible display device. Conversely, sliding from the unfolded state to the folded state, the part of the flexible display screen 4 displayed on the outside can be folded into the inner space of the slidable flexible display device, so as to reduce the screen of the slidable flexible display device and reduce the space occupied by the slidable flexible display device.

Figure 9:
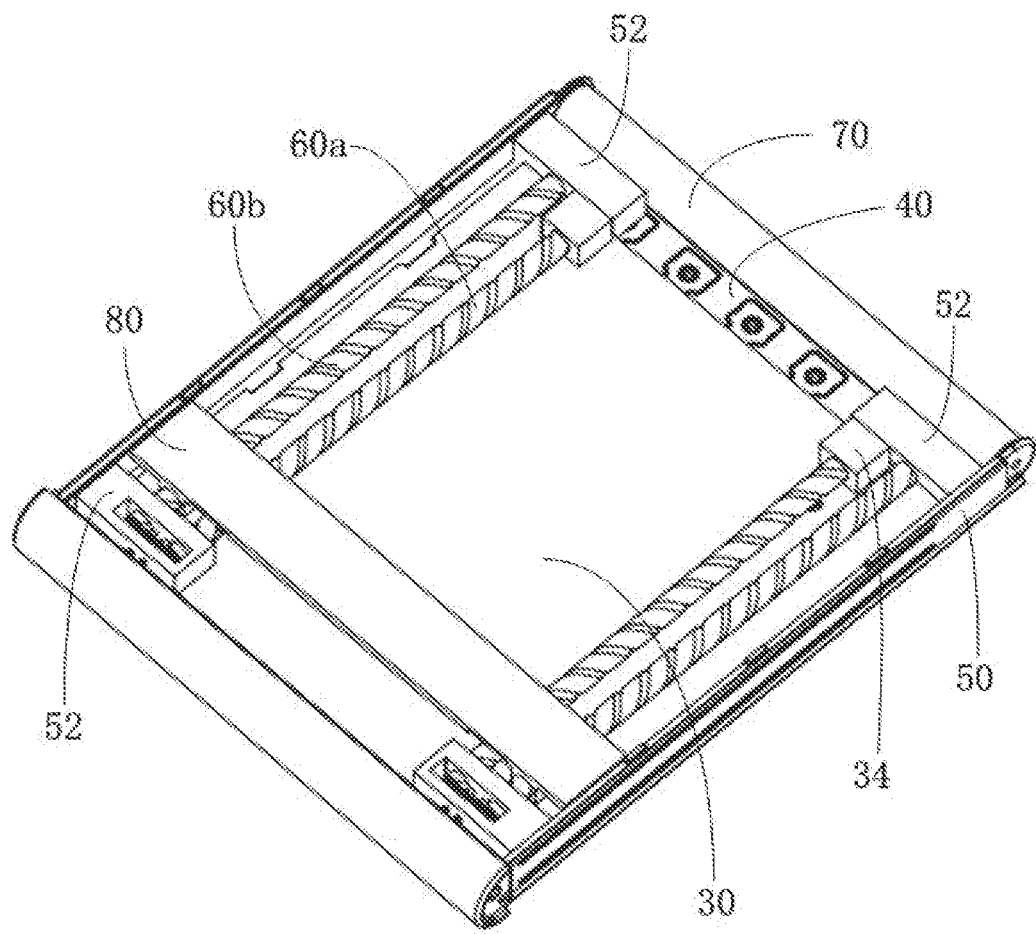
FIG. 9 is a schematic diagram of an internal structure of the slidable flexible display device in the folded state in the embodiment.
Figure 10:
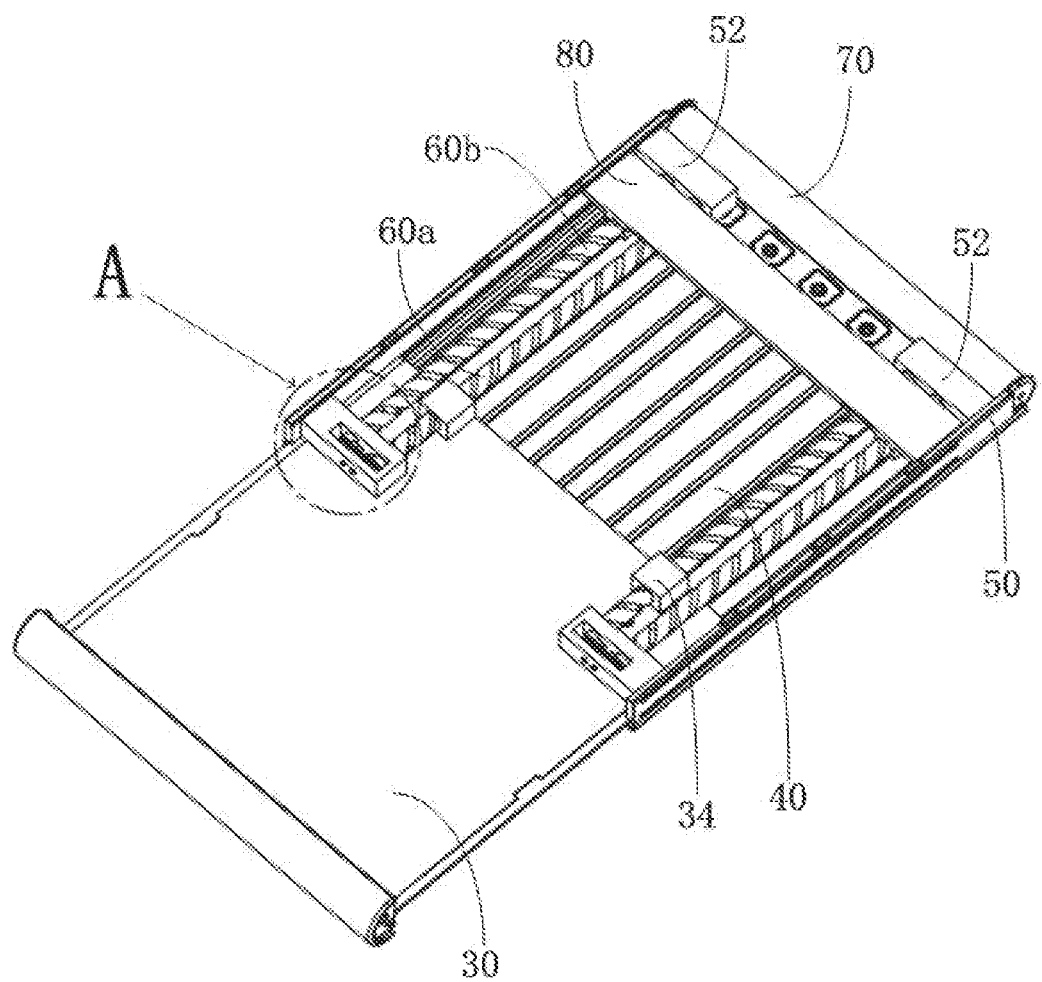
FIG. 10 is a schematic diagram of the internal structure of the slidable flexible display device in the unfolded state in the embodiment.
Figure 11:
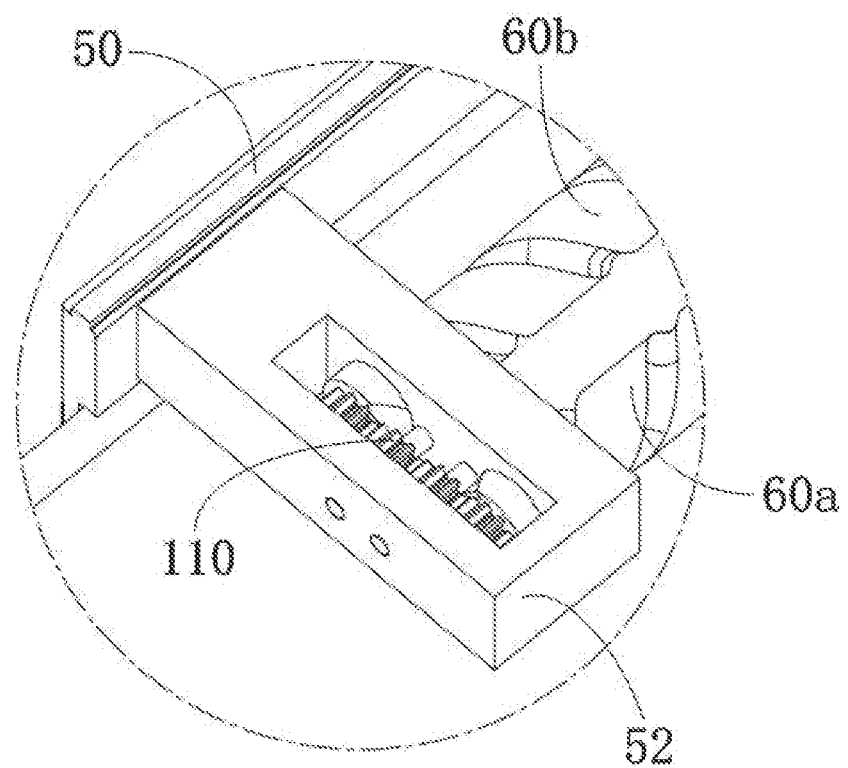
FIG. 11 is an enlarged view of part A in FIG. 10.

Furthermore, refer to FIG. 9 and FIG. 10, where a part of the rear shell is removed, and a positional relationship of the internal structure when the slidable flexible display device slides from the folded state to the unfolded state can be seen more clearly. The first supporting plate 30 and the screen fixing plate 80 are connected to the first screw rod 60a and the second screw rod 60b of the screw rod assemblies 60, respectively. Specifically, the first supporting plate 30 is linkage connected to the first screw rod 60*a* of the screw rod assemblies 60, and the screen fixing plate 80 is linkage connected to the second screw rod 60*b* of the screw rod assemblies 60. Through the screw rod assemblies 60, the first supporting plate 30 and the screen fixing plate 80 are slidable in opposite directions. For example, Refer to FIG. 11, which is an enlarged view at point A in FIG. 10. The rotating threaded structures on the surfaces of the first screw rod 60*a* and the second screw rod 60*b* are opposite, and the linkage gear 110 makes directions of rotational movement of the first screw rod 60*a* and the second screw rod 60*b* same, so that the first supporting plate 30 and the screen fixing plate 80 can be linked to slide in opposite directions. Since an end of the flexible display screen 4 is fixed to an arc end 32 of the first supporting plate 30, and another end of the flexible display screen is disposed around the roller 70, flipped to under the screw rod assemblies 60, and fixed on a surface of the screen fixing plate 80, therefore, it is conceivable that when the screen fixing plate 80 moves away from the first supporting plate 30, the flexible display screen 4 originally hidden in a housing is pulled out to an upper surface of the mechanism to realize the unfolding of the flexible display screen 4 and to increase a size of the display device. When the screen fixing plate 80 moves close to the first supporting plate 30, the unfolded flexible display screen 4 is folded to the inside of the mechanism to realize pull back of the flexible display screen 4, and shrinking the display device to a minimum size.

Similarly, in some embodiments, the screw rod assemblies 60 can be adjusted as follows. The directions of rotating threaded structures of the first screw rod 60*a* and the second screw rod 60*b* are opposite, and the rotating threaded structure on the surfaces of the first screw rod and the second screw rod is same. A linkage sliding movement of the first supporting plate 30 and the screen fixing plate 80 in opposite directions is realized.

In some embodiments, the linkage gear 110 can be connected to a motor. The motor drives a rotation of the linkage gear 110, so that the first screw rod 60*a* and the second screw rod 60*b* of the screw rod assemblies 60 automatically rotate. Then, the screw rod assemblies 60 links the first supporting plate 30 and the screen fixing plate 80 to slide in the opposite directions, so as to realize unfolding or folding of the flexible display screen 4. The unfolding and folding of the slidable flexible display device can be automatically switched by electric drive, instead of being driven by an external force, which is more convenient for practical applications.

The technical solutions of the embodiments of the present application are described in detail above. Specific examples are used in this article to illustrate the principles and implementation of the present application. The descriptions of the above embodiments are only used to help understand the technical solutions and core ideas of the present application. Persons of ordinary skill in the art should understand that they can modify the technical solutions recorded in the foregoing embodiments, or equivalently replace some of the technical features, and these modifications or replacements do not make the essence of the corresponding technical solutions depart from the scope of the technical solutions of the embodiments of the present application.

What is claimed is:

1. A slidable flexible display device, comprising:
    a first supporting body comprising a first rear shell and a first supporting plate fixedly disposed on the first rear shell;
    a second supporting body comprising a second rear shell, a second supporting plate, and side walls, wherein the side walls are disposed on both sides of the second rear shell, the second supporting plate is fixedly disposed on the side walls, and the first supporting body and the second supporting body are slidable along a straight line between the first supporting body and the second supporting body;
    a linkage mechanism comprising screw rod assemblies, a screen fixing plate, and a roller, wherein each of the screw rod assemblies comprises a first screw rod and a second screw rod disposed in parallel, the first screw rod and the second screw rod are rotatable and are connected to each other, each of the side walls is provided with one of the screw rod assemblies fixedly disposed on the side wall, the screen fixing plate and the first supporting plate are oppositely disposed on both sides of the screw rod assemblies, the roller is disposed close to an arc-shaped end of the second rear shell and is clamped between both the side walls, the roller is rotatable, and a rotation axis of the screw rod assemblies and a rotation axis of the roller are perpendicular to each other; and
    a flexible display screen disposed on the first supporting plate and the second supporting plate, wherein an end of the flexible display screen is fixed to an arc end of the first supporting plate, and another end of the flexible display screen is disposed around the roller, flipped to under the screw rod assemblies, and fixed on a surface of the screen fixing plate;
    wherein through a linkage connection between the first supporting plate and the first screw rods of the screw rod assemblies and a linkage connection between the screen fixing plate and the second screw rods of the screw rod assemblies, the first supporting plate and the screen fixing plate are slidable in opposite directions; when the screen fixing plate moves away from the first supporting plate, the flexible display screen is unfolded; and when the screen fixing plate moves close to the first supporting plate, the flexible display screen is folded.

2. The slidable flexible display device according to claim 1, wherein surfaces of the first screw rod and the second screw rod comprise rotating threaded structures.

3. The slidable flexible display device according to claim 1, wherein directions of rotating threaded structures of the first screw rod and the second screw rod of the screw rod assemblies are opposite, or directions of rotational movement of the first screw rod and the second screw rod of the screw rod assemblies are opposite.

4. The slidable flexible display device according to claim 1, wherein at least an end of the first screw rod or an end of the second screw rod of the screw rod assemblies is connected to a linkage gear to make the first screw rod and the second screw rod keep in linkage.

5. The slidable flexible display device according to claim 1, wherein a bottom of the first supporting plate comprises at least one first nut structure with a hole structure, and the first screw rod passes through the first nut structure.

6. The slidable flexible display device according to claim 5, wherein an inner surface of the first nut structure comprises a threaded structure matched with a rotating threaded structure of the first screw rod to make the first supporting plate connected to the screw rod assemblies through the first nut structure.

7. The slidable flexible display device according to claim 5, wherein a side of the screen fixing plate is provided with a second nut structure having a structure same as the first nut structure.

8. The slidable flexible display device according to claim 7, wherein an inner surface of the second nut structure comprises a threaded structure matched with a rotating threaded structure of the second screw rod to make the screen fixing plate connected to the second screw rod through the second nut structure.

9. The slidable flexible display device according to claim 1, wherein the side walls are an elongated structure, both ends of each of the side walls comprise a bracket structure, and the screw rod assemblies are disposed between the two bracket structures of the side walls.

10. The slidable flexible display device according to claim 9, further comprising a wall shaft disposed at the ends of the side walls outside of the bracket structures, both ends of the roller are respectively formed with a wall shaft hole matching the wall shaft, and the wall shaft hole of the roller is sleeved on the wall shaft.

11. The slidable flexible display device according to claim 9, wherein at least an end of the first screw rod or an end of the second screw rod of the screw rod assemblies is connected to a linkage gear to make the first screw rod and the second screw rod keep in linkage, and the linkage gear is disposed in the bracket structures.

12. The slidable flexible display device according to claim 1, further comprising a wall shaft disposed at ends of the side walls, both ends of the roller are formed with a wall shaft hole respectively, and a size of the wall shaft hole is matched to the wall shaft to dispose the roller on the side walls.

13. The slidable flexible display device according to claim 12,
wherein the wall shaft hole is sleeved on the wall shaft, and the roller is clamped and disposed between the two side walls to make the roller rotatable.

14. The slidable flexible display device according to claim 4, wherein the linkage gear is connected to a motor to automatically unfold and/or fold the flexible display screen.

15. A slidable flexible display device, comprising:
a first supporting body comprising a first rear shell and a first supporting plate fixedly disposed on the first rear shell;
a second supporting body comprising a second rear shell, a second supporting plate, and side walls, wherein the side walls are disposed on both sides of the second rear shell, the second supporting plate is fixedly disposed on the side walls, and the first supporting body and the second supporting body are slidable along a straight line between the first supporting body and the second supporting body;
a linkage mechanism comprising screw rod assemblies, a screen fixing plate, and a roller, wherein each of the screw rod assemblies comprises a first screw rod and a second screw rod disposed in parallel, the first screw rod and the second screw rod are rotatable and are connected to each other, each of the side walls is provided with one of the screw rod assemblies fixedly disposed on the side wall, the screen fixing plate and the first supporting plate are oppositely disposed on both sides of the screw rod assemblies, the roller is disposed close to an arc-shaped end of the second rear shell and is clamped between both the side walls, the roller is rotatable, and a rotation axis of the screw rod assemblies and a rotation axis of the roller are perpendicular to each other; and
a flexible display screen disposed on the first supporting plate and the second supporting plate, wherein an end of the flexible display screen is fixed to an arc end of the first supporting plate, and another end of the flexible display screen is disposed around the roller, flipped to under the screw rod assemblies, and fixed on a surface of the screen fixing plate;
wherein through a linkage connection between the first supporting plate and the first screw rods of the screw rod assemblies and a linkage connection between the screen fixing plate and the second screw rods of the screw rod assemblies, the first supporting plate and the screen fixing plate are slidable in opposite directions; when the screen fixing plate moves away from the first supporting plate, the flexible display screen is unfolded; when the screen fixing plate moves close to the first supporting plate, the flexible display screen is folded; and
wherein the side walls are provided with sliding structures disposed on an inner side of the side walls, and both sides of the first supporting plate are slidably connected to the side walls through the sliding structures.

16. The slidable flexible display device according to claim 15, wherein the sliding structures are mutually matching and respectively disposed on contact surfaces of the first rear shell and the second rear shell to make the first rear shell slidably connected to the second rear shell.

17. The slidable flexible display device according to claim 15, wherein the sliding structures are mutually matching and respectively disposed on contact surfaces of the first supporting plate and the second supporting plate to make the first supporting plate slidably connected to the second supporting plate.

18. The slidable flexible display device according to claim 15, wherein the sliding structures are mutually matching and respectively disposed on contact surfaces of the side walls and the first rear shell to make the side walls slidably connected to the first rear shell.

19. The slidable flexible display device according to claim 15, wherein a moving speed of the screen fixing plate relative to the second supporting body is same as a moving speed of the second supporting body relative to the first supporting body.

* * * * *